UNITED STATES PATENT OFFICE 2,409,275

CHEMICAL COMPOUNDS AND METHOD OF PRODUCING SAME

Benjamin R. Harris, Chicago, Ill.

No Drawing. Application May 19, 1944,
Serial No. 536,432

16 Claims. (Cl. 260—404.5)

This invention relates to the preparation of new and useful water-soluble or water-dispersible chemical compounds which are characterized by possessing interface modifying properties rendering the same highly useful for the purposes hereinafter set forth.

In general, the new and useful compounds and reaction products of the present invention are most suitably prepared by reacting an anhydride of a lower molecular weight carboxylic acid ester of a hydroxypolycarboxylic acid with a carboxylic acid partial amide of a polyamine, particularly an alkylene polyamine, the carboxylic acid radical of which amide contains preferably at least four carbon atoms and especially from eight to eighteen carbon atoms. By way of illustration, this may be exemplified by reacting the anhydride of the acetic acid ester of citric acid with the lauric acid mono-amide of ethylene diamine. In addition to the novelty of the method, the reaction products produced herein have never been disclosed heretofore and, therefore, their utility for the purposes hereinafter described has been unknown.

While many of the novel products of the present invention may best be defined in the form of reaction products, they and particularly some of the more potent constituents thereof can, at least in part, be characterized or described by way of structural formulae. Illustrative examples of such compounds which fall within the scope of the invention are as follows:

(1) 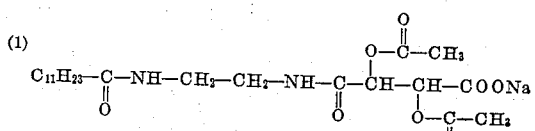

(2) 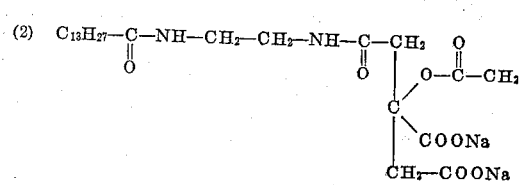

(3) 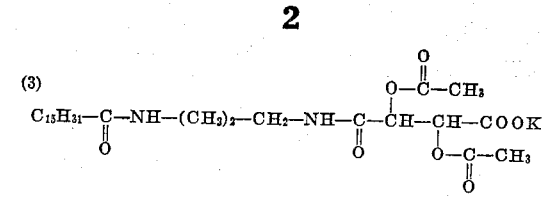

(4) 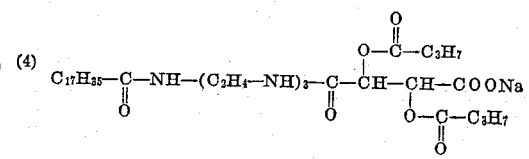

(5) 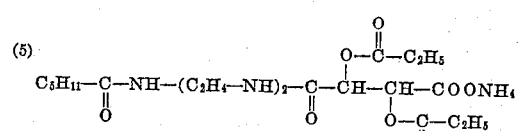

(6) 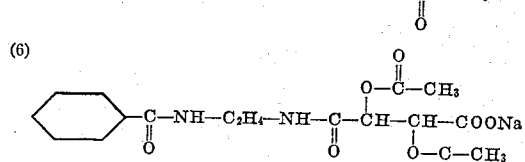

(7) 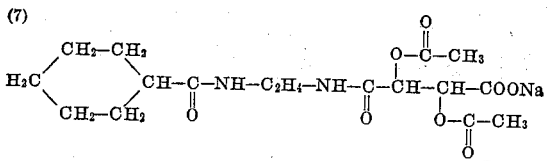

(8) 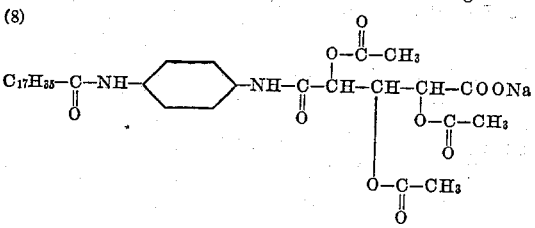

(9) 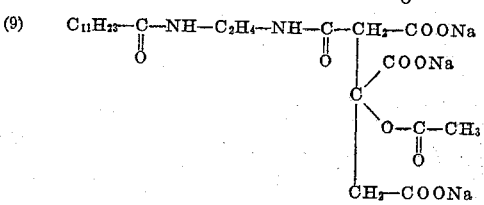

(10) 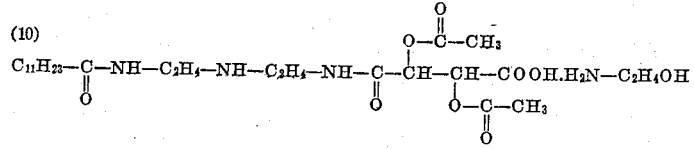

In order that the full significance of the invention may be even more apparent, the following illustrative examples are set forth. It will be appreciated that the proportions of reacting ingredients, times of reaction, temperatures of reaction, and the like may be varied and that supplementary process of purification and the like may be resorted to wherever found desirable or convenient. These and other variations and modifications will be evident to those skilled in the art in the light of the guiding principles which are disclosed herein.

Example A 24 parts of weight of the lauric acid monoamide of ethylene diamine and 23 parts by weight of the anhydride of the O-O-diacetic acid ester of tartaric acid anhydride are heated at about 100° C. to 115° C. until a homogeneous product is obtained. The resulting reaction product contains a substantial amount of a compound of the formula

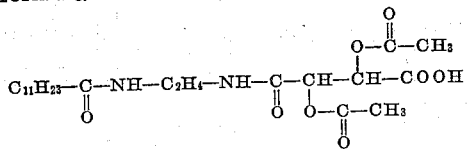

The product may be partially or completely neutralized with any of the alkaline materials mentioned hereafter. It shows good foaming and wetting-out characteristics. The reaction mixture may, if desired, be treated to recover the desired compound therefrom by means of organic solvents. Alternatively, if desired, the reaction mixture may be evaporated to dryness, preferably in vacuo, and used as such or the desired compound recovered therefrom by means of organic solvent media.

Example B 34 parts by weight of the palmitic acid monoamide of diethylene triamine and 23 parts by weight of the anhydride of the acetic acid ester of citric acid are heated at about 100° C. to 120° C. until a homogeneous product is obtained. The resulting product contains a substantial amount of a compound of the formula

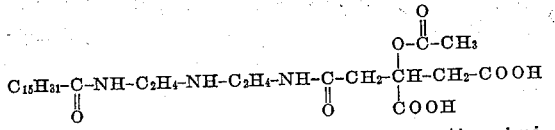

The reaction product, which had properties similar to those of Example A, may be neutralized in whole or in part, and may be treated, if desired, to recover the compound in pure or substantially pure form.

Example C 32 parts by weight of the oleic acid monoamide of ethylene diamine and 26 parts by weight of the anhydride of the propionic acid ester of citric acid are heated at about 100° C. to 120° C. until a homogeneous product is obtained. The resulting reaction product contains a substantial amount of a compound of the formula

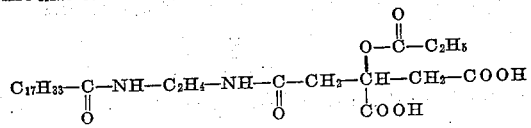

The reaction product, which has properties similar to those of Examples A and B, may be neutralized in whole or in part, and may be treated, if desired, to recover the compound in pure or substantially pure form.

The hydroxy polycarboxylic acid anhydrides whose acetic acid esters and similar derivatives are reacted with the esters, in accordance with the present invention, may be selected from a large group including, for example, citric acid, tartaric acid, malic acid, hydroxy methylsuccinic acid, trihydroxyglutaric acid, mucic acid, saccharic acid, and the mono- and poly-hydroxy derivatives of adipic acid, pimelic acid, suberic acid, azelaic acid, sebacic acid, and the like. It is preferred to employ the anhydrides of the acetic acid esters or like esters of those hydroxy polycarboxylic acids which are water-soluble and of aliphatic character. These acids may contain other substituents such as CN, $NH_2$, $NO_2$, F, Cl, Br, I, $SO_3H$, phosphate, sulphate, SCN, etc., but, for best results, substituents should be absent. Of particular importance are citric and tartaric acids.

In place of the anhydrides of the acetic acid esters of the hydroxy polycarboxylic acids, there may be employed the anhydrides of any carboxylic acid ester of a hydroxy polycarboxylic acid, said carboxylic acid being preferably water-soluble and of aliphatic or fatty character and particularly containing not more than six carbon atoms although the invention is not so limited. Examples of such derivatives are those from propionic acid, butyric acid, valeric acid, maleic acid, succinic acid, and the like. Of particular utility, however, are the acetic acid ester derivatives.

The partial amides which are reacted with the anhydrides of the acetic acid esters of the hydroxy polycarboxylic acids may be derived from a large group of carboxylic acids and polyamines. Representative of such partial amides are, for example, including some of those set out hereinabove, the lauric acid mono-amide of ethylene diamine, the oleic acid mono-amide of ethylene diamine, the lauric and oleic acid mono-amides of diethylene triamine, the caprylic acid monoamide of triethylene tetra-amine, the ricinoleic acid mono-amide of propylene diamine, and the like.

A representative list of carboxylic acids the partial amides of which with the polyamines are utilized in accordance with the present invention comprises straight chain and branched chain, saturated and unsaturated, carboxylic, aliphatic (including cycloaliphatic), fatty, aromatic, hydro-aromatic, and araliphatic acids including acetic acid, propionic acid, butyric acid, caproic acid, pimelic acid, enanthic acid, caprylic acid, pelargonic acid, capric acid, sebacic acid, behenic acid, arachidic acid, cerotic acid, erucic acid, melissic acid, stearic acid, oleic acid, ricinoleic acid, ricinelaidic acid, ricinostearolic acid, linoleic acid, linolenic acid, lauric acid, myristic acid, palmitic acid, mixtures of any two or more of the above-mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil and other fish oils, partially or complete hydrogenated animal and vegetable oils such as those mentioned; oxidized hydroxy and alpha-hydroxy higher carboxylic, aliphatic and fatty and/or polymerized higher fatty acids or higher fatty acids derived from oxidized and/or polymerized triglyceride oils; acyloxy carboxylic acids such as C₁₇H₃₅—CO—O—CH₂—COOH; acids such as i-hydroxy stearic acid, dihydroxypalmitic acid, di-hydroxy-stearic acid, dihydroxybehenic acid, alpha-hydroxy capric acid, alpha-hydroxy stearic acid, alpha-hydroxy palmitic acid, alpha-hydroxy lauric acid, alpha-hydroxy myristic acid, alpha-hydroxy coconut oil mixed fatty acids, alpha-hydroxy margaric acid, alpha-hydroxy arachidic acid, and the like; fatty and similar acids derived from various waxes such as beeswax, spermaceti, montan wax, coccerin, and carnauba wax and higher molecular weight carboxylic acids derived, by oxidation and other methods, from paraffin wax, petroleum and similar hydrocarbons; resinic and hydroaromatic acids such as hexahydrobenzoic acid, naphthenic acid and abietic acid; araliphatic and aromatic acids such as phthalic acid, benzoic acid, Twitchell fatty acids, naphthoic acid, pyridine carboxylic acid; hydroxy aromatic acids such as salicylic acid, hydroxy benzoic and naphthoic acids, and the like. It will be understood that mixtures of any two or more of said acids may be employed if desired and it will also be appreciated that said acids may contain substituent groups such as sulphate, sulphonic, nitrile, cyanogen, carbonyl, amide, amine, halogen, ketone and other groups. Of particular utility are the unsubstituted fatty acids containing from twelve to eighteen carbon atoms.

The polyamines the partial amides of which are employed in the reactions may be selected from a large group, particularly the alkylene polyamines and polyalkylene polyamines and the alkyl and aralkyl derivatives thereof, as for example, ethylene diamine, diethylene triamine, triethylene tetra-amine, propylene diamine, butylene diamine, dipropylene triamine, mono-ethyl ethylene diamine, mono-ethyl diethylene tetra-amine, piperazine, mono-ethyl ethylene diamine monoethyl diethylene triamine, beta-dimethyl-amino-ethyl amine, and the like.

It will be understood that partial amides of any of the listed carboxylic acids with any of the listed polyamines may be utilized for reaction in accordance with the invention.

The reaction products may be used as such or they may be neutralized, in whole or in part, with suitable anti-acid materials. In this connection, considerable latitude and modification may be exercised. In general, inorganic as well as organic anti-acid agents may be employed. Examples of such agents which may be used satisfactorily are bicarbonates of the alkali metals, potassium hydroxide, potassium carbonate, metallic sodium, sodium hydroxide, sodium oxide, sodium carbonate, ammonium hydroxide, ammonia gas, calcium, magnesium, ammonium, and zinc oxides, hydroxides, and salts, potassium stearate, sodium stearate, and the like; organic nitrogenous bases such as primary, secondary and tertiary amines including alcohol-, alkylol-, and aralkylol-amines, including monoethanolamine, diethanolamine, triethanolamine, propanolamines, butanolamines, pentanolamines, hexanolamines, glycerolamines, sugar alkylolamines and sugar alcohol alkylolamines such as those of dextrose, sucrose, sorbitol, mannitol and the like; dimethyl monoethanolamine, diethyl monoethanolamine, dibutyl mono-ethanolamine, diethanol methyl amine, diethanol ethyl amine, diethanol butanol amine, cyclohexyl ethanolamine, diethanol cyclohexylamine, ethanol aniline, alkylol polyamines such as alkylol derivatives of ethylene diamine, mono-methyl mono-ethanolamine, diethyl mono-ethanolamine; 1-amino-2, 3-propanediol; 1,2-di-amino-propanol; alkylamines such as ethylamine, propylamine, laurylamine, cetylamine, butylamine, hexylamine, cyclohexylamine, aniline, toluidines, dimethylamine, diethylamine, N-methyl-N-ethyl amine, triethylamine, trimethylamine, ethylene diamine, diethylene triamine, triethylene tetra-amine, betaine, mono-methyl ethylene diamine, monoethyl diethylene tetra-amine, mono-allyl amine, hydrazine and substituted hydrazine, aromatic and heterocyclic bases and cyclic nitrogenous substances such as benzylamine, cyclohexylethyl aniline, morpholine, pyridine, dimethylaniline, N-methyl-N-benzyl amine, N-ethyl-N-naphthyl amine, quinoline, quinaldine, piperidine, alkyl pyridines such as methylpyridine, pyrrolidines, nicotine, and homologues and derivatives or substitution products thereof, and, in general, primary, secondary and tertiary amines substituted or not with other radicals, such as hydroxy, alkyl, aryl, cycloalkyl groups and the like; quaternary ammonium bases or hydroxides such as tetra-methyl ammonium hydroxide, tetra-ethyl ammonium hydroxide, quaternary ammonium bases with dissimilar alkyl radicals such as methyl-triethyl ammonium hydroxide, propyl trimethyl ammonium hydroxide; mixtures of any two or more of said bases as, for example, in the case of commercial triethanolamine which contains minor proportions of mono and di-ethanolamine; proteins and partial digestion or hydrolysis products thereof. It will be understood that these substituted ammonium compounds or organic nitrogenous bases may be utilized in pure, impure, or commercial form.

It will be understood that by the term "cation," as used throughout the specification and claims, is meant hydrogen and such other elements as are mentioned herein, and, in general, atoms or radicals which are regarded as bearing a positive charge or capable of replacing acidic hydrogen. The reaction products may be neutralized to methyl orange, litmus or phenolphthalein or to any desired hydrogen ion concentration. As a general rule, if the salts of the reaction products are employed, it is preferred to use the sodium, potassium, ammonium, alkylolamine, or other soluble salts.

The compounds of the invention have utility in various arts in which interface modifying agents are employed. Many of them are fairly resistant to precipitation by calcium and magnesium salts and are compatible with acid and alkali media. They may be utilized in washing and laundering and in the textile and related industries wherein they function for wetting, lathering, detergent, emulsifying, penetrating, dispersing, frothing and foaming purposes. The textiles, various treatments of which in the presence of the agents of the present invention is rendered effective, comprise natural products such as cotton, wool, linen and the like as well as the artificially produced fibres (and fabrics) such as rayon, cellulose, acetates, cellulose ethers and similar artificial silk fabrics. It will be understood, of course, that the agents may be used in aqueous and other media either alone or in combination with other suitable salts of organic or inorganic character or with other interface modifying agents. In the dyeing of textiles many of them may be employed as assistants in order to bring about even level shades. Many of them also may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of hair washes and hair shampoos, dentrifices of liquid, cream and powder type, cosmetic creams such as cold creams, vanishing creams, tissue creams, shaving creams of the brushless and lathering type and similar cosmetic preparations. Another use to which many of the agents of my invention may be placed is for the treatment of paper or paper pulp or the like. Their capillary or interfacial tension reducing properties enables them to be employed in the fruit and vegetable industry in order to effect the removal from fruits and the like of arsenical and similar sprays. They possess utility in the ore dressing industry wherein they function effectively in froth flotation and agglomeration processes. Their interface modifying properties also permit their use in lubricating oils and the like enabling the production of effective boring oils, cutting oils, drilling oils, wire drawing oils, extreme pressure lubricants and the like. Various of them possess bactericidal, germicidal, bacteriostatic, antiseptic, disinfectant, fungicidal, preserving and, in general, chemotherapeutic properties which render them useful in various environments such as tooth pastes, tooth powders, liquid dentifrices, mouth washes and the like. Many of them may also be used with effect in the preparation of metal and furniture polishes, shoe polishes, in rubber compositions, for breaking or demulsifying petroleum emulsions such as those of the water-in-oil type which are encountered in oil-field operations, in paints and the like, and for various other purposes which will readily occur to those versed in the art in the light of my disclosure herein.

As detergents, they may in general be dissolved in water or aqueous media and utilized in that form or, in the case of solid products, they may be packaged and sold in such form preferably mixed with diluents. They may also be utilized for commercial cleansing, laundering and washing operations with advantage.

It will be understood that the products of the present invention may be employed for their various purposes either alone or together with lesser or greater quantities of inorganic or organic compounds. Thus, for example, many of them may be employed together with salts such as sodium chloride, alkali metal phosphates including pyrophosphates and tetraphosphates, sodium sulphate, alums, perborates such as sodium perborate, and the like. Many of said products may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophilic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating or detergent agents such as the higher molecular weight alkyl sulphates, phosphates, pyrophosphates, and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulpho-succinate, dilauryl potassium sulpho-glutarate, lauryl monoethanolamine sulpho-acetate, and the like; higher fatty acid partial esters of aliphatic polyhydric alcohols, such as monolaurin, mono-olein, monostearin, dilaurin, lauric acid mono-ester of ethylene glycol or diethylene glycol, stearic and oleic acid partial esters of polyglycerols, and the like; sulphuric and sulphonic derivatives of condensation products of alkylolamines and higher fatty acids; reaction products of phosphoric, pyrophosphoric, meta-phosphoric tetraphosphoric, and polyphosphoric acids with higher molecular weight alcohols; Turkey-Red oils; compounds of the type of isopropyl naphthalene sodium sulphonate, and other classes of wetting agents, such as cationic agents, for example, lauryl amine and lauryl amine hydrochloride, lauryl pyridinium chloride, octadecyl pyridinium iodide, quaternary ammonium compounds generally, and the like.

It will be understood that the compounds need not be utilized in the pure state. Indeed, in most instances it will be found to be more convenient and commercially desirable to employ them in the form of their reaction mixtures with or without the addition of diluents. It will also be understood that mixtures of any one or more of the reacting constituents may be employed in producing the products hereof and this is particularly the case where commercial supplies of the chemicals are utilized; and, in addition, any of the esters of the hydroxy polycarboxylic acid anhydrides listed above may be reacted with any of the partial amides of the polyamines described.

The term "higher," as used herein and in the claims to describe carboxylic and fatty acids and the like, will be understood to mean at least eight carbon atoms unless otherwise specifically stated.

The term "poly" wherever used herein will be understood to be employed in its usual sense, namely, to denote two or more.

What I claim as new and desire to protect by Letters Patent of the United States is:

1. A process of preparing new chemical compounds which comprises condensing a carboxylic acid mono-amide of a polyamine with an anhydride of an aliphatic carboxylic acid ester of an aliphatic hydroxy-polycarboxylic acid, the radical of said last-mentioned aliphatic carboxylic acid containing less than 6 carbon atoms, to amidify the mono-amide of the polyamine through a carboxyl group of said polycarboxylic acid anhydride.

2. A process of preparing new chemical compounds which comprises condensing a fatty acid mono-amide of an alkylene polyamine, the fatty acid radical of which contains at least 6 carbon atoms, with an anhydride of a lower molecular weight fatty acid ester of a water-soluble aliphatic hydroxy-dicarboxylic acid, the lower molecular weight fatty acid radical of which contains less than 6 carbon atoms, to amidify the mono-amide of the alkylene polyamine through a carboxyl group of said dicarboxylic acid anhydride.

3. A process of preparing new chemical compounds which comprises condensing the lauric acid mono-amide of an alkylene diamine with an anhydride of a lower molecular weight aliphatic monocarboxylic acid mono-ester of a water-soluble aliphatic hydroxy-polycarboxylic acid, the lower molecular weight aliphatic monocarboxylic acid radical of which contains less than 6 carbon atoms, to amidify the mono-amide of the alkylene diamine through a carboxyl group of said polycarboxylic acid anhydride.

4. A process of preparing new chemical compounds which comprises condensing a fatty acid mono-amide of an ethylene polyamine, the fatty acid radical of which contains from 8 to 18 carbon atoms, with an anhydride of a water-soluble acetic acid ester of an aliphatic hydroxy-polycarboxylic acid, to amidify the mono-amide of an ethylene polyamine through a carboxyl group of said polycarboxylic acid anhydride.

5. From water-soluble to water-dispersible aliphatic carboxylic acid esters of aliphatic hydroxy-polycarboxylic acids, the aliphatic carboxylic acid radical of which contains less than 6 carbon atoms, at least one carboxyl group of said hydroxy-polycarboxylic acid being amide-linked to a carboxylic acid amide of a polyamine containing at least one free primary amino group, said amide-linkage occurring through said primary amino group of said carboxylic acid amide of a polyamine.

6. From water-soluble to water-dispersible fatty acid esters of aliphatic hydroxy-polycarboxylic acids, the fatty acid radical of which contains less than 6 carbon atoms, at least one carboxyl group of said hydroxy-polycarboxylic acid being amide-linked to a carboxylic acid amide of an alkylene polyamine containing at least one free primary amino group, said amide-linkage occurring through said primary amino group of said carboxylic acid amide of an alkylene polyamine.

7. From water-soluble to water-dispersible aliphatic carboxylic acid esters of aliphatic hydroxy-polycarboxylic acids, the aliphatic carboxylic acid radical of which contains less than 6 carbon atoms, at least one carboxyl group of said hydroxy-polycarboxylic acid being amide-linked to a fatty acid mono-amide of an alkylene diamine, the fatty acid radical containing from 8 to 18 carbon atoms.

8. From water-soluble to water-dispersible acetic acid esters of aliphatic hydroxypolycarboxylic acids, at least one carboxyl group of said hydroxy-polycarboxylic acid being amide-linked to a fatty acid mono-amide of an ethylene polyamine, the fatty acid radical of said mono-amide containing at least 8 carbon atoms.

9. From water-soluble to water-dispersible acetic acid esters of water-soluble hydroxy-polycarboxylic acids, at least one carboxyl group of said hydroxypolycarboxylic acids being amide-linked to a fatty acid mono-amide of ethylene diamine, the fatty acid radical of said mono-amide containing at least 8 carbon atoms.

10. Amides of lower molecular weight aliphatic carboxylic acid esters of aliphatic hydroxy polycarboxylic acids, the lower molecular weight aliphatic carboxylic acid radical containing less than 6 carbon atoms, with fatty acid amides of alkylene polyamines, the fatty acid radical of which contains from 8 to 18 carbon atoms.

11. Amides of polyamines containing at least 2 primary amino groups, one of said primary amino groups being amidified with a carboxylic acid containing at least 6 carbon atoms in a straight chain, and one of said primary amino groups being amidified by a lower molecular weight aliphatic carboxylic acid ester of a hydroxy-polycarboxylic acid through a carboxyl group of the hydroxy-polycarboxylic acid, the lower molecular weight aliphatic carboxylic acid radical of said ester containing less than 6 carbon atoms.

12. Amides of ethylene diamine wherein one amino group of the ethylene diamine is amidified with a fatty acid containing from 8 to 18 carbon atoms, and the other amino group of the ethylene diamine is amidified by the acetic acid ester of tartaric acid through a carboxyl group of the tartaric acid.

13. The acetic acid ester of citric acid at least one carboxyl group of which is amide-linked to a carboxylic acid amide of a polyamine, and salts thereof.

14. The acetic acid ester of citric acid at least one carboxyl group of which is amide-linked to the lauric acid mono-amide of ethylene diamine, and salts thereof.

15. Chemical compounds in accordance with the formula

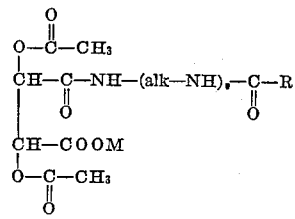

Where

is a fatty acid acyl radical containing from 8 to 18 carbon atoms, alk is alkylene, M is a cation, and $v$ is an integer from 1 to 3.

16. Chemical compounds in accordance with the formula

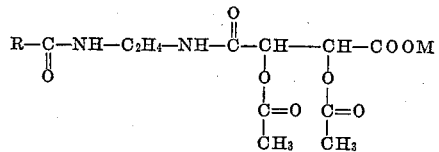

Where

is a fatty acid acyl radical containing from 8 to 18 carbon atoms, and M is a cation.

BENJAMIN R. HARRIS.